United States Patent [19]

Eckert

[11] Patent Number: 5,308,501
[45] Date of Patent: May 3, 1994

[54] TREATMENT SYSTEM FOR ALKALINE OR ACIDIC SOLUTION CONTAINING HEAVY METALS

[76] Inventor: C. Edward Eckert, 260 Lynn Ann Dr., New Kensington, Pa. 15068

[21] Appl. No.: 41,981

[22] Filed: Apr. 2, 1993

[51] Int. Cl.$^5$ .............................. C02F 1/62; C02F 1/64
[52] U.S. Cl. ..................... 210/718; 210/719; 210/720; 210/724; 210/912; 210/913; 204/149; 423/42; 423/43; 423/55; 423/104; 423/140; 423/150.3
[58] Field of Search ............... 210/718, 719, 720, 724, 210/912, 913, 748; 204/149; 423/42, 43, 55, 104, 140, 150.3

[56] References Cited

U.S. PATENT DOCUMENTS

| | | | |
|---|---|---|---|
| 4,163,716 | 8/1979 | Turnbull | 210/28 |
| 4,188,272 | 2/1980 | Moring | 204/149 |
| 4,693,798 | 9/1987 | Gale et al. | 204/149 |
| 4,749,497 | 6/1988 | Kanzleifer et al. | 210/724 |
| 5,000,859 | 3/1991 | Suciu et al. | 210/724 |
| 5,013,453 | 5/1991 | Walker | 210/712 |
| 5,098,579 | 3/1992 | Leigh et al. | 210/724 |
| 5,106,508 | 4/1992 | Schwitzgebel | 210/913 |
| 5,211,853 | 5/1993 | Jackson et al. | 210/724 |

FOREIGN PATENT DOCUMENTS 51972  4/1974  Japan ................................ 210/720

*Primary Examiner*—Neil M. McCarthy
*Attorney, Agent, or Firm*—Andrew Alexander

[57] ABSTRACT

There is disclosed a method of treating a solution, e.g., an alkaline or acidic solution, containing heavy metals ions therein. With respect to alkaline solutions, the method includes providing a body of the solution; contacting the body with a material such as carbon dioxide to change the pH, e.g., to lower the pH to a pH in the range of 9 to 10.5; then treating the solution to further change the pH and cause precipitation of hydroxides, including chromium hydroxide; and separating the hydroxide precipitates from the solution to provide a substantially neutral solution having a reduced amount of chromium ions, for example, contained therein.

52 Claims, 4 Drawing Sheets

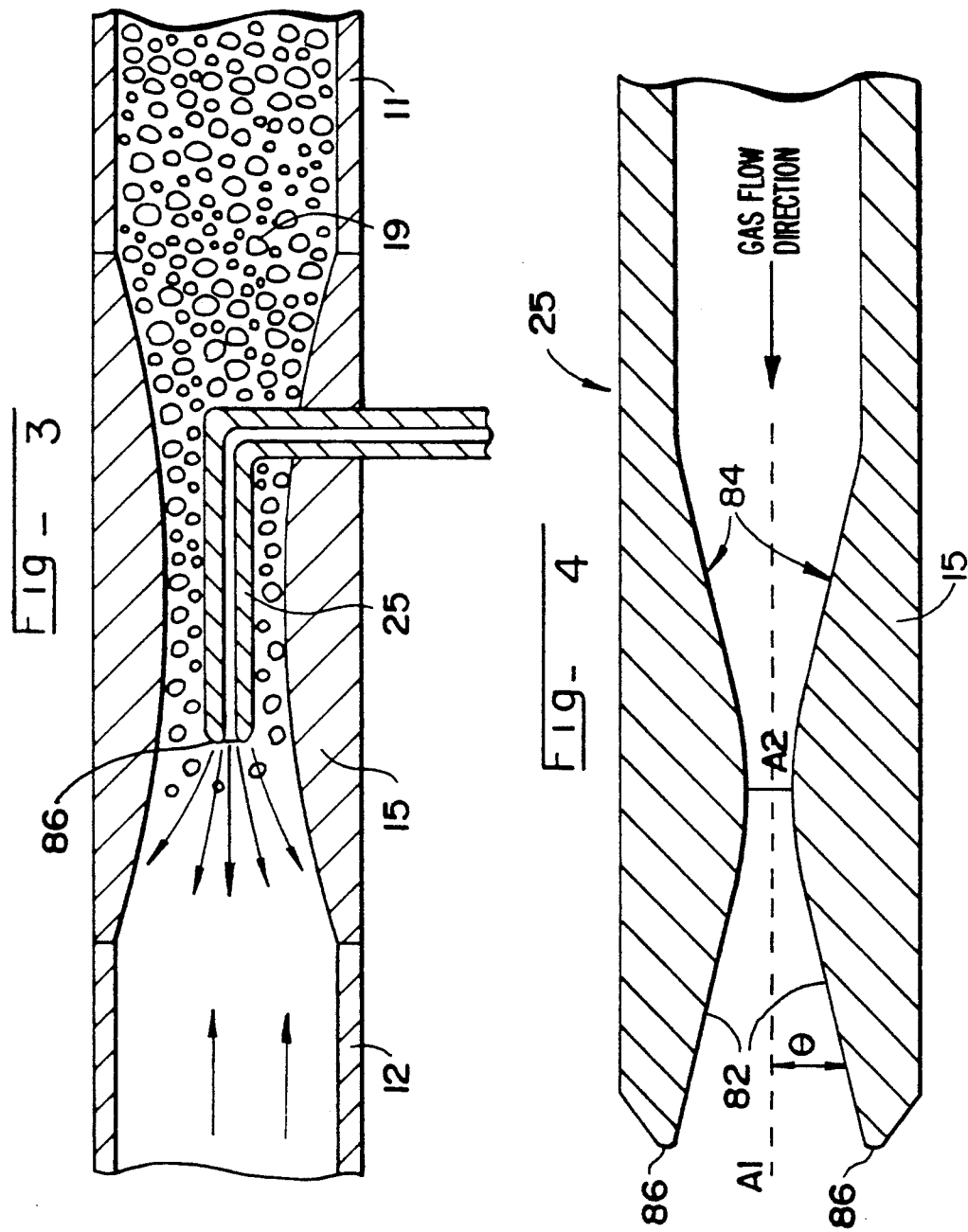

TREATMENT SYSTEM FOR ALKALINE OR ACIDIC SOLUTION CONTAINING HEAVY METALS

BACKGROUND OF THE INVENTION

This invention relates to a treatment system for alkaline or acid solutions containing heavy metals, and more particularly, it relates to a system and method for substantially neutralizing a low or high pH solution and removing heavy metals therefrom.

Systems and methods for neutralizing aqueous solutions and removing contaminants therefrom are well known in the prior art. For example, $CO_2$ gas is injected into alkaline solutions to lower the pH of the solution. However, a problem that is prevalent in many of these systems is the large equipment required for performing such steps. The equipment can include, for example, large holding and mixing tanks, large settling tanks and clarifiers. Further to the use of such large equipment, large amounts of chemicals have to be added for purposes of neutralization or flocculation, and this also can lead to disposal problems.

In the art, U.S. Pat. No. 4,188,272 discloses treatment of an aqueous solution containing hexavalent chromium by electrolytic addition of ions to form metal hydroxides in a stream at pH of 4.5 to 5.8. U.S. Pat. No. 4,693,798 discloses electrolytically generating Fe ions in a solution having a pH of less than 2.8 and containing hexavalent chromium to form metal hydroxides, thereby removing the hexavalent chromium. U.S. Pat. No. 4,163,716 discloses the use of electrolysis with an iron cathode to form ferric and ferrous hydroxide to remove heavy metal ions and colored substances after ion exchange of a dye house effluent. U.S. Pat. No. 5,013,453 discloses a method for removing heavy metal ions from an aqueous solution wherein the method comprises coprecipitating heavy metal ions with a carrier precipitate which is formed in situ.

Thus, there is a great need for a compact and efficient system for neutralizing a high pH solution, for example, and for removing heavy metals therefrom prior to disposing of the solution. The present invention provides such a system which enables reduction of pH from 11 or 12, for example, to about pH of 7 and at the same time enables removal of heavy metals such as chromium ions, etc., from such solution. For example, with respect to heavy metals, the present invention enables reduction of chromium to a level of 0.02 ppm. Further, as well as treating basic or alkaline solutions, the invention is capable of neutralizing acidic solutions and removing heavy metals therefrom.

SUMMARY OF THE INVENTION

It is an object of the invention to provide a solution treatment system to substantially neutralize a solution and remove heavy metals therefrom.

It is another object of the invention to provide a two-stage reaction for reduction of pH in a high pH solution and for removal of heavy metals therefrom.

Yet, it is another object of the invention to provide a first stage reaction wherein a pH solution is treated with a gaseous material to lower the pH thereof.

And yet, it is another object of the invention to lower the pH of a solution in a second stage while precipitating heavy metal ions such as chromium ions therefrom.

And yet, it is another object of the invention to neutralize an acidic solution and remove heavy metals therefrom.

Yet, it is a further object of the invention to manipulate the pH of a solution to favor metal hydroxide formation.

These and other objects will become apparent from the specification, drawings and claims appended hereto.

In accordance with these objects, there is provided a method of treating a solution, e.g., an alkaline or acidic solution, containing heavy metals ions therein. With respect to alkaline solutions, the method comprises providing a body of the solution; contacting the body with a material such as carbon dioxide to change the pH, e.g., to lower the pH to a pH in the range of 9 to 10.5; then treating the solution to further change the pH and cause precipitation of hydroxides, including chromium hydroxide; and separating the hydroxide precipitates from the solution to provide a substantially neutral solution having a reduced amount of chromium ions, for example, contained therein.

BRIEF DESCRIPTION OF THE DRAWINGS

FIG. 3 is a cross-sectional view of a nozzle and pipe shaped mixing chamber for the mixing of gas and liquid.

FIG. 4 is a cross-sectional view of a supersonic nozzle for use in the present invention.

DETAILED DESCRIPTION OF THE PREFERRED EMBODIMENTS

Figure 1:
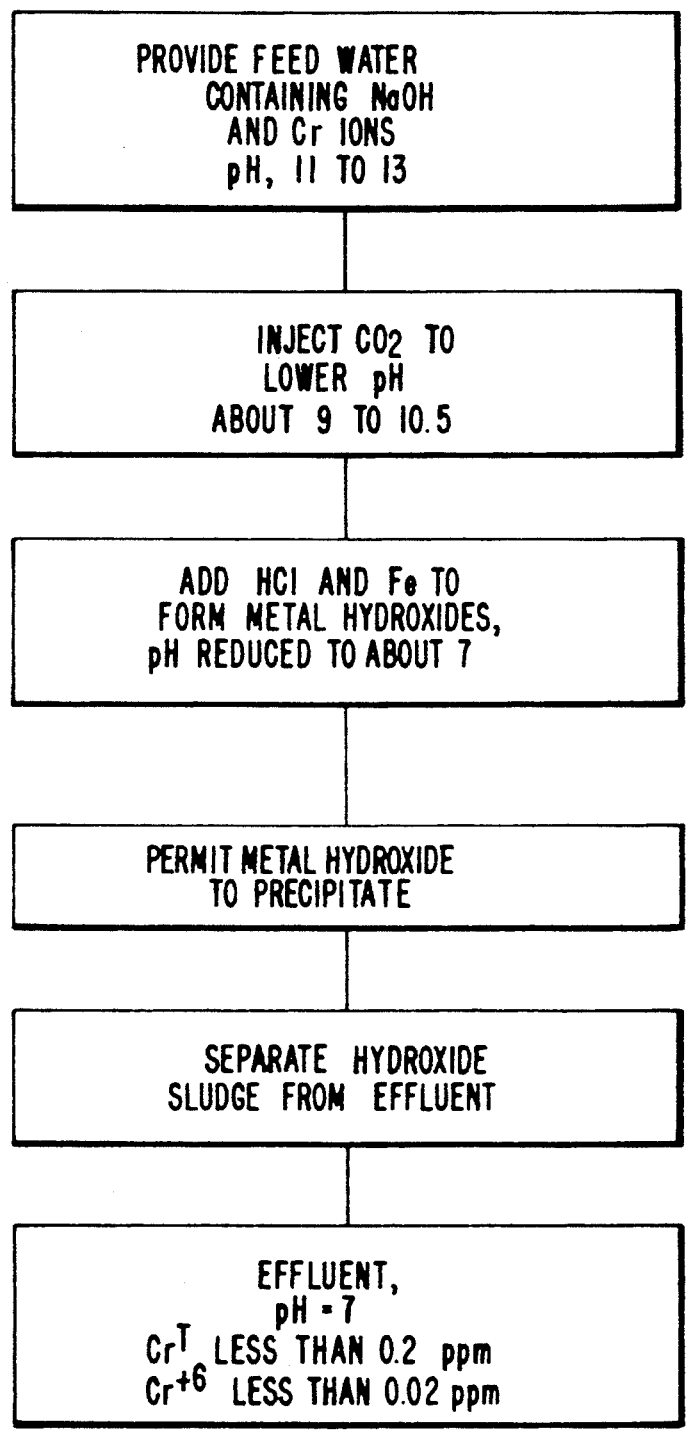
FIG. 1 is flow diagram showing steps in treating feed water to reduce the pH thereof and remove heavy metals therefrom.

Referring to FIG. 1, there is provided a flow chart showing steps of the invention. The process of the invention may be divided into three phases. In the first phase, the pH of the solution is adjusted. In the second phase, the solution is treated to precipitate heavy metals and further substantially neutralize the solution, if necessary. In the third phase, the heavy metals are separated from the solution. By substantially neutralize is meant that the solution has a pH range which may permit discharge of the solution, for example, a pH in the range of 6 to 8 and preferably a pH in the range of about 6.5 to 7.5.

Figure 2:
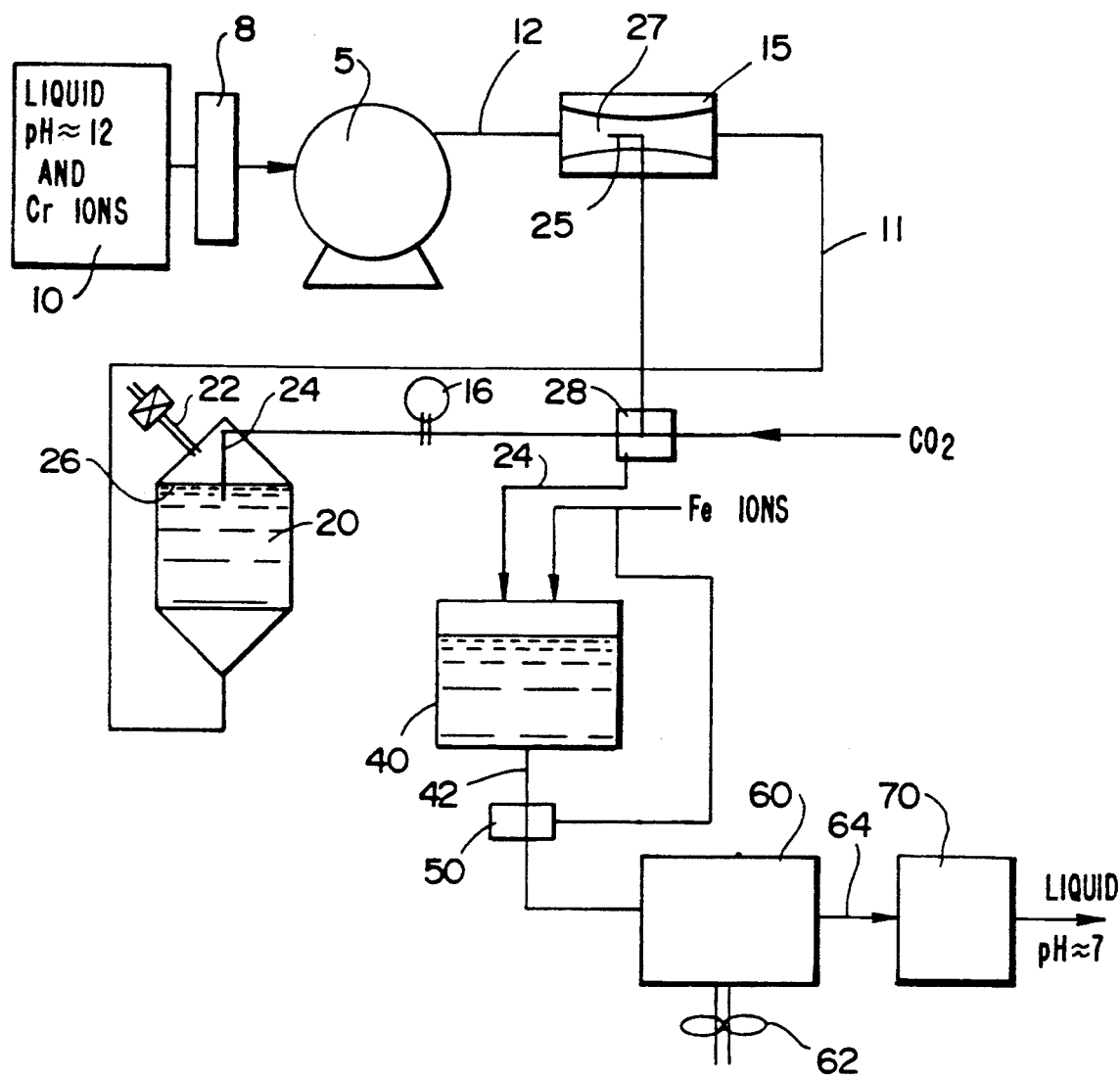
FIG. 2 is a flow chart showing detailed steps for treating liquid to substantially neutralize the pH and remove heavy metals therefrom.

By reference to FIG. 2, there is provided a generalized schematic of the invention. Liquid to be treated is provided in a holding tank 10. Pump 5 pumps liquid, preferably through filter 8, along line 12 and then through converging-diverging pipe 15. In a preferred embodiment, $CO_2$ gas is injected through nozzle 25 into the liquid as it passes through converging diverging pipe 15. $CO_2$ and liquid then pass along line 11 to reactor 20. Thereafter, liquid leaves reactor 20 via line 24 past monitor 28 to precipitator 40. The level of $CO_2$ in the system can be controlled by pressure regulator 38 located on line 22 of reactor 20. Thus, after $CO_2$ is injected into the system, it is maintained in reaction vessel 20 at a pressure in the range of 10 to 675 psig. Reactor 20 provides for residence time for reaction of $CO_2$ with hydroxides in the solution to form reaction products such as sodium carbonate and sodium bicarbonate. Iron ions are added to precipitator 40 for purposes of forming and precipitating metal hydroxides.

Liquid and metal hydroxide precipitate then pass along line 42 to separator 60 where metal hydroxide sludge is removed through valve 62. Thereafter, liquid and finely divide metal hydroxide particles not removed in separator 60 pass along line 64 to filter 70 where the precipitate is removed by filtration. The process preferably is carried out in a continuous basis wherein the steps occur as the solution is pumped through the system. Further, continuous basis can include performing certain steps while maintaining other steps such as collecting solution in the settling step where solution may be held to permit precipitate to settle and be removed as sludge.

In the first phase of the invention, alkaline or acidic solutions to be treated may be filtered or strained to remove particles therefrom. If the solution is basic, the pH can be in the range of 10.5 to 13.8, typically 11 to 13, and can contain a substantial amount of chromium, iron, nickel, zinc or copper ions. If the solution is acidic, the pH can range from about 1 to 5.5.

In accordance with the invention, a material such as a reactive gas is added for purposes of neutralizing the solution. When the solution is alkaline, it is important to reduce the pH of the solution to a pH in the range of 8.5 to 10.5 for purposes of removing heavy metals in accordance with the invention. For example, a controlled amount of acid can be added to lower the pH to a pH in the range of 8.5 to 10.5. The acid added can be hydrochloric, sulfuric or chromic acid, for example. If it is preferred to use a gaseous material, the alkaline solution can be contacted with carbon dioxide. If the solution is acidic, it may be contacted with an alkaline material or basic material. If it is preferred to use a gaseous material, an alkaline gas such as ammonia gas, hydrazine ($H_4N_2$) gas or alkaline vapors may be used to contact the acidic solution. The ammonia gas has the effect of raising the pH as it neutralizes the acidic solution. The reaction for a typical acid solution contacted with ammonia gas is as follows:

$$H_2SO_4 + 2NH_3 \rightarrow (NH_4)_2SO_4$$

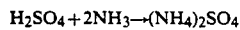

The ammonia gas may be introduced through a nozzle in the same way that the carbon dioxide is introduced as noted with respect to FIG. 2.

In the case of contacting the alkaline solution with carbon dioxide, this has the effect of converting metal hydroxides, for example sodium hydroxide contained therein, to metal carbonates. For example, the following reaction is given for a sodium hydroxide solution (at a pH of greater than 10) contacted with carbon dioxide:

$$2NaOH + CO_2 \rightarrow Na_2CO_3 + H_2O$$

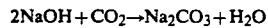

At a pH in the range of 8.5 to 10, the reaction for carbon dioxide and sodium hydroxide is a follows:

$$NaOH + CO_2 \rightarrow NaHCO_3$$

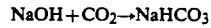

The effect of the reaction enables reduction in the alkalinity of the incoming solution to a pH in the range of about 7.5 to 11 and typically 8.5 to 10.5 by removing the sodium hydroxide. Similarly, calcium hydroxide would be converted to calcium carbonate and potassium hydroxide would be converted to potassium carbonate. Other metal hydroxides may be converted in a similar manner.

When carbon dioxide gas is used, contacting of incoming solution with carbon dioxide may be achieved by any method that permits the reaction to adjust the pH of the solution to the range desired. For example, the carbon dioxide may be bubbled into the solution or alternately dispersed into the solution using a number of dispersers depending on the efficiency of the reaction desired. Other gas phase reactants which may be used for purposes of neutralization and pH control include $SO_2$, $SO_3$, HCl and other sweeping gases.

In a preferred embodiment (as shown in FIG. 2), the carbon dioxide is injected into the solution using a nozzle or injector 25 as the solution is pumped by pump 5 from a holding tank 10 through line 12 and then through pipe 15 to reactor 20. Nozzle 25 is located in pipe 15 for purposes of injecting the $CO_2$ into the solution as the solution is flowing to reactor 20.

PUMPING AND INJECTING

It is preferred that pumping is performed by pump 5 to pressurize the solution flowing through the system from pump 5 to after reaction vessel 20. The liquid pressure in the system can range from 10 to 175 and preferably from 20 to 150 psig, with a typical pressure being in the range of 60 to 80 psig. A pressure regulator 16 can be located down stream on pipe 24 to control the pressure of the solution flowing through the system.

Further, for purposes of obtaining improved mixing of solution with gas e.g. $CO_2$ or $NH_3$, it is preferred to accelerate the flow rate of the solution (alkaline or acidic) as it passes through pipe 15. This may be achieved by having pipe 15 converge as it approaches nozzle 25. Pipe 15 preferably diverges after nozzle 25 for purposes of aiding accelerating flow through pipe 15. Thus, the inside of pipe 15 is designed to permit liquid to flow at 0.2 to 300 ft/sec and typically 3 to 150 ft/sec. As the liquid is accelerated through pipe 15, carbon dioxide is injected into the stream. The carbon dioxide may be injected substantially perpendicular to the liquid or in a direction counter to or in the same direction as the liquid flow. Preferably, the gas, alkaline or acidic, e.g., $CO_2$ or $NH_3$, is injected into the liquid stream substantially counter current to the flow direction of the liquid through pipe 15 (as shown in FIG. 3). Counter current injection of gas has the added advantage that more complete mixing is obtained between the carbon dioxide gas being injected and the solution or liquid being contacted. For purpose of intensifying the mixing, the carbon dioxide gas is injected under a pressure of about 25 to 675 psig and preferably 50 to 500 psig, and typically, 150 to 450 psig in the direction counter current to the liquid flow.

Also, further preferably, a nozzle is selected to enable injection of $CO_2$ or $NH_3$ gas under speeds which reach supersonic conditions at the exit of the nozzle. Thus, for purposes of the present invention, the velocity of the gas at the exit of the nozzle can be in the range of Mach 1 to Mach 5, with preferred ranges being Mach 2 to Mach 4, with a typical velocity being about Mach 3. When the gas is injected under supersonic conditions, it is preferred that it is injected substantially counter current to the flow direction of the solution. This enables more complete reaction in a very short period of time. For example, time for reaction under these conditions would not normally exceed 2 minutes and typically can be less than 1 minute, for example, less than 0.5 minute. Thus, the reaction to lower the pH can occur in a time period of 0.05 to 1 minute. It will be understood that lesser velocities, e.g., below Mach 1, can be used but these normally do not provide as much mixing and thus may be used on a less preferred basis.

NOZZLE DESIGN

For purposes of the present invention, the preferred nozzle has a design which permits supersonic gas flow conditions, as the gas exits the nozzle as noted. Such nozzle has a convergent-divergent design and is shown in FIG. 4. Thus, gas flow through nozzle 25 first converges at wall 84 until it reaches the smallest diameter before diverging and finally exiting nozzle 25. The angle at which walls 82 diverge is in the range of 3 to 10 degrees. Preferably, nozzle 25 has ends 86 which are contoured so as to provide low resistance to counter current liquid flow. This design has the effect of emitting the gas therefrom not only at supersonic velocity but in a fan like configuration (see FIG. 3). This enables intimate contacting of the gas with the solution passing through pipe 15. Thus, mixing and contacting occur almost instantaneously, permitting very efficient reaction conditions. After injection of the solution under these conditions, a two phase gas and liquid suspension or emulsion exits tube 15 and is conveyed to reactor 20. Nozzle 25 can be fabricated from metal or ceramic material.

In one aspect of the invention, a series or cascade of gas injection/precipitation and precipitation/separation steps may be employed. For example, it may be desirous to first lower the pH of the solution to a pH in the range of 10 to 11 and iron ions added for purposes of forming and removing nickel hydroxides. Then, the pH may be lowered to a pH in the range of 7.5 to 8.5 and iron ions added for forming and removing copper hydroxide. Finally, the pH may be further lowered to 7 to 8 for forming and removing chromium hydroxide. When the pH range overlaps as with copper and chromium both metal hydroxides may be formed and removed simultaneously depending to some extent on the level of removal desired. For example, it may be desired to favor removal of chromium in which case the pH range for forming and removing of hydroxides should be lower. In any event, it will be seen that the invention contemplates several steps of hydroxide formation and removal.

REACTOR

Reactor 20 permits reaction of hydroxides in solution, e.g., sodium hydroxide and carbon dioxide injected thereinto, to proceed towards completion. That is, reactor 20 permits liquid in the system to remain in contact with the $CO_2$ gas for a short period under pressure and to permit the reaction of $CO_2$ with alkaline material in the solution to go to the desired level. As noted earlier, $CO_2$ under pressure is advantageous because the pressure enables higher levels of $CO_2$ to be contained in the solution which enables more efficient and complete reaction of $CO_2$ gas with hydroxides in the solution. For example, the solution can contain 1 to 12 additional standard volumes of $CO_2$ when the pressure of $CO_2$ is maintained in the range of 10 to 200 psig. Preferably, 3 to 7 standard volumes of $CO_2$ are maintained in the solution.

Figure 5:
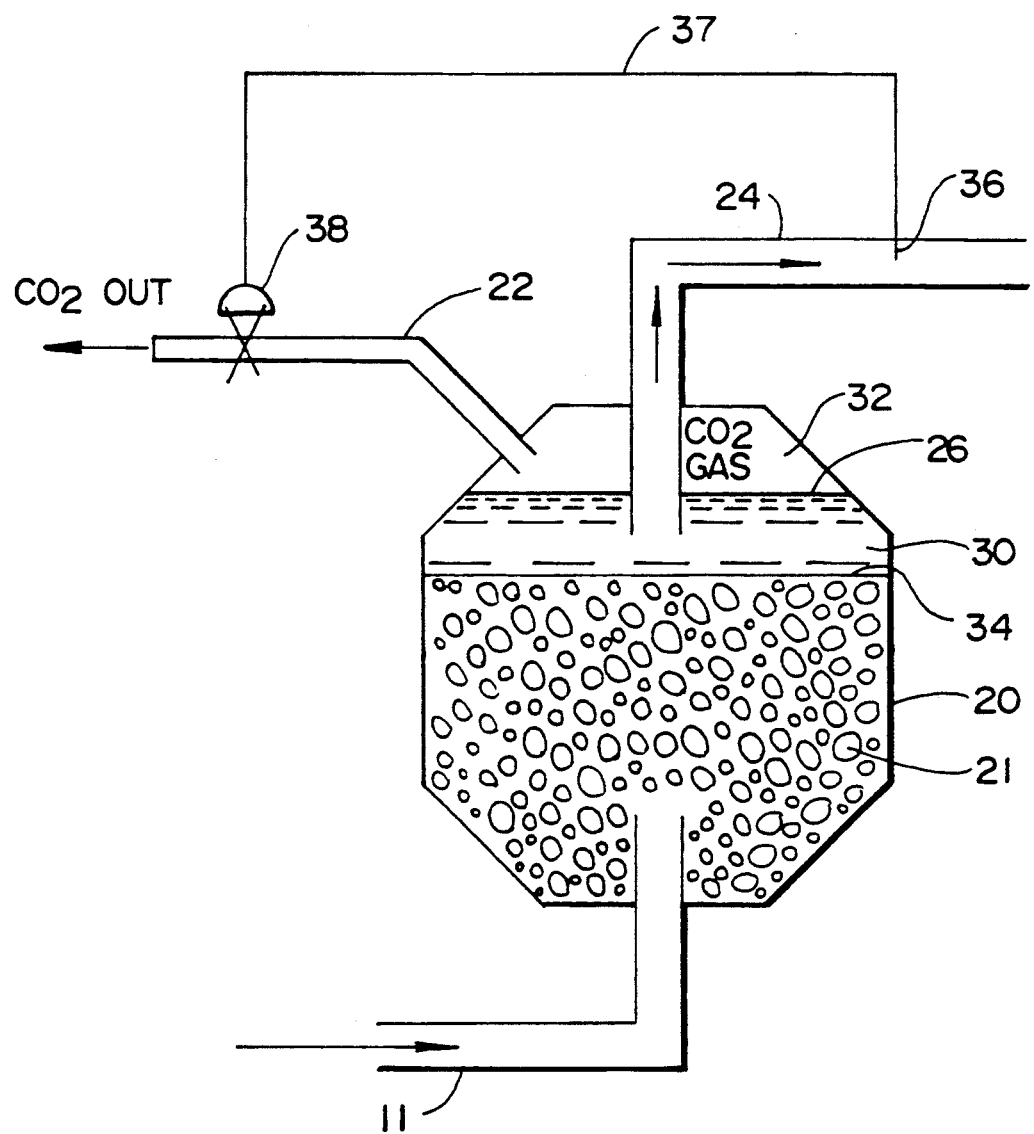
FIG. 5 is a cross-sectional view of the reaction vessel.

The reactor may be packed with rashig rings, saddles, or large grains, etc,. for purposes of maintaining a longer period of contact of carbon dioxide with the solution. As shown in FIG. 5, a tube 22 is provided to vent carbon dioxide gases from the reactor. Further, for purposes of removing solution from the reactor, a tube 24 is extended below solution or liquid level 26 in the reactor and liquid is transferred to tank 40, FIG. 2. In a preferred embodiment, the pH of the liquid from the reactor is monitored by pH meter 28 and the readings therefrom are used to control the flow of carbon dioxide to nozzle 25. In this way, sufficient carbon dioxide can be added to maintain the pH of the solution exiting reactor 20 in the desired range, for example 8.5 to about 10.5.

As presently understood, reactor 20 should be at least half filled with packing material. However, the volume of packing material can vary depending on the type of packing material used. Further, it is preferred that liquid 30 have a level above that of level 34 of packing material 21 to permit withdrawal of liquid through pipe 24. Further, preferably, in reactor 20 a volume 32 is provided for unreacted $CO_2$ gas to collect after it escapes from liquid 30. $CO_2$ gas in volume 32 of reactor 20 is maintained at a pressure in the range of 25 to 675 psig and preferably 50 to 500 psig. As seen in FIG. 5, a monitor 36 may be provided in pipe or line 24 to monitor the amount of gas contained in liquid 30 being removed from reactor 20. If the gas in liquid 30 exceeds a set amount this may be automatically adjusted by a signal along line 37 to valve 38 which opens in response to said signal to exhaust $CO_2$ gas from reactor 20. The $CO_2$ gas removed through valve 38 may be recovered, compressed and re-used. This lowers the pressure of $CO_2$ gas in reactor 20 and the amount of $CO_2$ gas contained in liquid 30 being removed. Preferably, the amount of $CO_2$ in liquid 30 being removed along line 24 is not greater than 0.3 standard vol. %. When other gases are used, e.g. $NH_3$, they would be maintained at pressures similar to that for $CO_2$.

SECOND PHASE

In the second phase of the process, the pH of the solution in tank 40 is further lowered and heavy metal ions contained therein are precipitated. That is, the pH of the solution is lowered to a pH lower than that leaving reactor 20, e.g. the pH range of 8.5 to 10.5. The pH of the solution in tank 40 is preferably lowered to a pH in the range of about 6.5 to 9, with a typical pH being in the range of about 7 to 8. The pH may be lowered by the addition of an acid such as HCl, $H_2SO_4$ and $HNO_3$. The amount of acid added is an amount sufficient to bring the pH to about 6.5 to 9. It is important that the pH be maintained in the range of 6.5 to 9, preferably 7 to 8 for the optimum removal of $Cr^{+6}$. That is, at a pH in this range, e.g., 7 to 8, the formation of $Cr(OH)_3$ is optimized in a solution of the present invention, utilizing $Fe^{+2}$ ions. If the removal of Ni ions is desired, then optimum pH range is about 10 to 11 for the formation of nickel hydroxide. Similarly, if removal of Cu ions is desired, then the preferred pH range is about 7.5 to 8.5 for the formation of copper hydroxides. Thus, it will be seen that in the present invention, the pH can be adjusted depending on the concentration of heavy metal ions.

For purposes of removing heavy metal ions such as chromium, iron, nickel and copper, iron ions, e.g., $Fe^{+2}$, can be added with the acid. The addition of iron ions enables the formation of metal hydroxide, e.g., chromium hydroxide, as follows:

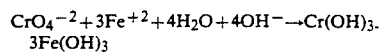

$CrO_4^{-2} + 3Fe^{+2} + 4H_2O + 4OH^- \rightarrow Cr(OH)_3 \cdot 3Fe(OH)_3$

In this way, chromium ions, for example, are precipitated from the solution in tank 40. Other metal ions, e.g., nickel or copper ions, can be removed in a similar manner.

In the present invention, the time period to reduce the pH to a pH in the range of 7 to 8 is a matter of seconds, e.g., less than 10 seconds and is typically less than 3 seconds. For purposes of forming metal hydroxides, e.g., chromium hydroxides, the reaction can require a time period in the range of 0.5 to 10 minutes, with a typical time period of about 1 to 4 minutes being required for nucleation and growth of the metal hydroxide precipitates to a size which permits ease of filtration.

While $Fe^{+2}$ can be added by use of a pickling solution, ferrous chloride or a mixture of ferric and ferrous chloride may be added to sulfuric or hydrochloric acid, for example, to provide the source of $Fe^{+2}$ ions. Preferably, $Fe^{+2}$ ions are supplied in an excess of 3 parts $Fe^{+2}$ ions to 1 part $Cr^{+6}$ ions. Excess $Fe^{+2}$ ions provides for more complete removal of $Cr^{+6}$ or other heavy metal. As solution is removed from tank 40 along line 42, FIG. 2, the acidity or alkalinity of the solution can be monitored by pH monitor 50. In this way, the amount of acid or base required to neutralize the solution in tank 40 can be controlled.

ELECTROLYSIS

In another aspect of the invention, while a pickling acid can be used to lower pH and to supply $Fe^{+2}$ ions, the pickling acid can contain other materials which are not desirable. Thus, in this aspect of the invention, $Fe^{+2}$ ions are supplied from an ion source by electrolysis via the half cell reaction:

$$Fe \rightarrow Fe^{+2} + 2e^-$$

When $Fe^{+2}$ ions are supplied by electrolytic cation introduction, the pH of the solution is lowered as OH ions are used up in the reaction which converts $Cr^{+6}$ and $Fe^{+2}$ to $Cr(OH)_3$ and $Fe(OH)_3$. A consumable ion anode may be used to supply $Fe^{+2}$ ions and a cathode comprised of carbon or platinum or other material may be used to complete the cell. In this aspect of the invention, it is not necessary to add acid to further lower the pH of the solution. Further, any metal ions such as manganese which operate to convert hexavalent chromium or other such metals to the hydroxide may be used. Further, the method of supplying $Fe^{+2}$ has the advantage that the reaction can be carried out at the pH range which most favors formation of the metal hydroxide. As noted earlier, for example, a pH of 7 to 8 is most favorable for formation of $Cr(OH)_3$. Accordingly, it is desirable to carry out the electrolysis at this pH range when $Cr^{+6}$ is to be removed. For purposes of providing $Fe^{+2}$ ions, a voltage sufficient to maintain a half cell potential at the anode of approximately 0.5 volts can be used. The amperage can vary depending on the chromium level.

In a preferred embodiment, the anode and cathode may be Fe and further preferably the polarity between the cathode and anode is switched not less than about every 2 seconds. This has effect of removing any build up of precipitate or sludge on the anode and of providing a self-cleaning mechanism.

THIRD PHASE

In the third phase of the system, solution from tank 40 may be passed to a separator 60 where the precipitates may be permitted to nucleate and grow in size, if desired, before being subjected to a filtering step 70. Preferably, the precipitates reach a size of at least 5 μm.

FILTRATION

Filtration in the present invention can be carried out in less than 1 minute and typically less than about 10 seconds and enables removal of precipitates from the solution. The precipitates can range in size from 0.2 to 500μm.

Filtration enables collection of the $Cr(OH)_3$ and $Fe(OH)_3$ on the surface of the filter media. When filter cake builds to a level which hinders flow rate, the filter media is changed.

As an alternative to replacing the filter media, the flow through the filter media can be interrupted and an acid solution passed through the filter media to redissolve the $Cr(OH)_3$ and $Fe(OH)_3$ precipitates. Only a small volume of acid is required to redissolve the precipitates. The acid can be reused until saturation occurs at which time the precipitate can be removed by sedimentation. Acids which are suitable for dissolving the precipitate from the filter media include $H_2SO_4$ or HCl. Time for dissolving the precipitates from the filter media is relatively short and usually takes no longer than about 30 seconds. After filtering the solution can be discharged.

Thus, the present invention has the advantage that chromium, nickel or copper ions, for example, can be removed to a very low level. For example, $Cu^{+2}$ can be removed to less than 0.2 ppm, and $Cr^{+6}$ can be removed to less than 0.02 ppm. Further, the present invention has the advantage that an alkaline or acidic solution can be substantially neutralized as the heavy metals are being removed. In addition, neutralization and removal of heavy metals can be made to occur in a short time period, e.g., less than about 10 or 12 minutes and can occur on a continuous basis. Another advantage resides in the fact that only compact equipment is required, and there is no need for large equipment facilities, including evaporater, clarifiers, etc. Further, the system of the present invention is a closed loop system with only minimal chance of reagents escaping into the atmosphere.

While the invention has been described in detail with respect to treating an alkaline solution with the use of $CO_2$ gas, it should be noted that it has applications to acidic solutions where, for example, $NH_3$ gas is injected into the acidic solution as described with respect to $CO_2$ gas and such is contemplated within the scope of the invention.

The precipitate may be removed by continuous low or high pressure filtration. Low pressure filtration can comprise a rotary cloth filter drum contacting solution containing precipitate. The inside of the drum is subjected to vacuum and a layer of precipitate or filter cake accumulates on the cloth filter. Excess filter cake is scraped off and thus precipitate is removed in this manner. In a preferred embodiment, high pressure continuous media filtration is used to remove precipitate from the solution. In this system a continuous media filter, such as cloth, is used that is sealed on the sides to prevent escape of filtrate. High pressure solution containing precipitate or filtrate is applied against filter cake collected on the media. That is, high pressure filtrate is introduced to one side of a filter medium, resulting in the development of a filter cake. As the cake thickness increases, the pressure required to maintain a constant filtrate flow rate also increases. A differential pressure sensor monitors this pressure, and provides a proportional output to the media drive mechanism that correspondingly adjusts the media renewal feed rate at a value needed to maintain a constant filtration pressure. Thus, a filtering system is provided which removes precipitate or sludge from the system on a continuous basis. In addition, separated and dewatered sludge can be removed from the filter media and processed in a manner to render is less hazardous. An example of such processing is to pass the sludge through a plasma plume to convert the sludge from hydroxides to metal oxides.

EXAMPLE

An alkaline solution at a pH of about 12.7 and containing 0.33 mg/l Cu, 7.31 mg/l Ni, and 0.24 mg/l hexavalent chromium, with a total Cr content of 7.2 mg/l, was pumped through a filter or strainer to remove particles therefrom. Thereafter, a stream of the strained solution was pumped using a jet pump to a reaction vessel and then pumped to a precipitator for forming and precipitating chromium hydroxide and other hydroxide precipitates. After transferring solution to a separator, precipitates were permitted to settle out in the form of sludge. After the sludge was separated from the solution, the solution was filtered to remove remaining fine precipitate.

The stream pumped to the reaction vessel was pumped through a converging/diverging pipe containing a nozzle for injecting $CO_2$ gas into the solution stream. The stream passed through the pipe at a velocity of 24 ft/sec or a rate of 4.5 gallons/minute. As the stream passed through the pipe, $CO_2$ gas was injected into the stream through a nozzle in a direction counter current to the flow of the solution stream. The $CO_2$ gas exited the nozzle at a velocity of about Mach 3 and formed an emulsion with the solution. The flow of solution swept the solution and $CO_2$ gas past the nozzle and into the bottom or lower section of the reaction vessel. The reaction vessel had a cylindrical shaped middle section and cone shaped bottom and top sections and was about seven eighths filled with tabular alumina packing material. Solution was maintained in the reaction vessel to a level higher than the packing material. The level of solution was maintained sufficiently low to provide for a $CO_2$ gas space above it. The residence time for solution in the reactor was about 0.2 minutes. $CO_2$ gas was permitted to escape from the solution in the reaction vessel, and a pressure of about 75 psig was maintained above the solution in the reaction vessel. If $CO_2$ gas pressure exceeded 75 psig, $CO_2$ was removed from the reaction vessel through an exhaust valve. The pH of solution in the reaction vessel was about 9.5. A stream of solution was removed from the reaction vessel to a precipitator by means of a tube having its end located in solution above the packing material. The $CO_2$ gas level in the stream leaving the reaction vessel was monitored and the level of $CO_2$ in the stream fed back to the $CO_2$ exhaust valve. In addition, the pH of the solution exiting the reaction vessel was maintained at about 9.5 pH. If the pH exceeded this level, then a signal was sent to a $CO_2$ mass flow sensor and additional $CO_2$ gas added to further lower the pH of the solution to the set point.

Hydrochloric acid containing ferrous ions was added to the precipitator containing the solution from the reaction vessel. Solution was added and taken from the precipitator on a continuous basis. The pH of the solution was monitored leaving the precipitator and was set at about 7.03. If the pH exceeded the set point, a signal was relayed to a flow meter for feeding additional acid to the precipitator. Thereafter, the stream leaving the precipitator containing metal hydroxide precipitate was taken to a separator where the precipitate was permitted to settle and was removed as sludge. The remaining solution was filtered to remove precipitate particles not removed in the separator. After filtering, the solution contained a total Cr level of 0.07 ppm, less than 0.02 ppm hexavalent Cr, 0.08 ppm Cu, 3.01 ppm Ni and had a pH of 7.03.

While the invention has been described in terms of preferred embodiments, the claims appended hereto are intended to encompass other embodiments which fall within the spirit of the invention.

What is claimed is:

1. A method of continuously treating an alkaline solution containing heavy metal ions comprising hexavalent chromium and at least one metal ion selected from the group consisting of iron, nickel, zinc, and copper to lower the pH of the solution and reduce the amount of said heavy metal ions contained therein, comprising:
    (a) providing a body of said aqueous solution;
    (b) contacting the body with $CO_2$ gas to lower the pH thereof;
    (c) maintaining said $CO_2$ gas in contact with said solution at a pressure in the range of 25 to 675 psig during said contacting;
    (d) adding metal ions selected from the group consisting of $Fe^{+2}$ and Mn to the solution having lowered pH to reduce said hexavalent chromium to trivalent chromium and to form metal hydroxide precipitates and chromium hydroxide; and
    (e) separating the heavy metal hydroxide precipitates from the treated solution to provide a solution having a reduced amount of heavy metal ions contained therein and having a lowered pH.

2. The method in accordance with claim 1 wherein the $CO_2$ gas lowers the pH of the solution to a pH in the range of 7.5 to 11 to provide a pH range for formation of metal hydroxide precipitates.

3. The method in accordance with claim 1 wherein Fe ions are added in an acid selected from the group consisting of HCl, $H_2SO_4$, and $NHO_3$.

4. The method in accordance with claim 1 wherein the metal ions added are Fe ions added electrolytically from an Fe anode.

5. The method in accordance with claim 1 wherein a stream of solution from said body is pumped to a reaction vessel, and $CO_2$ gas is injected into said stream through a nozzle, the velocity of said solution in said stream being in the range of 0.2 to 300 ft/sec.

6. The method in accordance with claim 5 wherein the $CO_2$ gas is injected in a direction counter current to the flow of said stream from said body to said reactor.

7. The method in accordance with claim 6 wherein the $CO_2$ gas is injected into said solution at a supersonic exit velocity from said nozzle.

8. The method in accordance with claim 7 wherein the $CO_2$ gas is injected into said stream at a velocity in the range of Mach 1 to Mach 5.

9. The method in accordance with claim 7 wherein the $CO_2$ gas is injected into said stream at a velocity in the range of Mach 2 to Mach 4.

10. The method in accordance with claim 5 wherein the velocity of the stream is in the range of 3 to 150 ft/sec.

11. The method in accordance with claim 1 wherein the pH is in the range of 10.5 to 13.8.

12. The method in accordance with claim 1 wherein the $CO_2$ gas is maintained in contact with said solution at a pressure in the range of 50 to 500 psig.

13. A method of treating an alkaline solution on a continuous basis, the solution having a pH in the range of 10.5 to 13.8 and containing heavy metal ions selected from the group consisting of $Cr^{+6}$, Ni, Cu, Fe, and Zn, the method reducing the pH to a pH in the range of 7 to 8.2 and providing reduced amounts of heavy metal ions therein, the method comprising:
(a) providing a body of said alkaline solution;
(b) pumping a stream of alkaline solution from said body to a reaction vessel, the stream having a nozzle located therein to inject $CO_2$ gas into said solution in a direction counter current to the direction of flow of said stream, the velocity of said stream being in the range of 0.2 to 300 ft/sec;
(c) injecting said $CO_2$ gas into said stream at a supersonic velocity exiting said nozzle to lower the pH of the solution to a pH in the range of 7.5 to 10.5;
(d) maintaining said $CO_2$ gas in contact with said solution at a pressure in the range of 25 to 500 psig in said reaction vessel;
(e) electrolytically adding Fe ions to the solution having lowered pH, the Fe ions reducing said heavy metal ions to form heavy metal hydroxide precipitates and simultaneously therewith lowering the pH of the solution; and
(f) separating the heavy metal hydroxide precipitates from solution to provide a solution having lowered pH and reduced amounts of heavy metal ions.

14. The method in accordance with claim 13 wherein the Fe ions are added electrolytically by passing electrical current from an Fe anode to an Fe cathode wherein the polarity on the anode and cathode is reversed not less than every 2 seconds.

15. The method in accordance with claim 13 wherein said $CO_2$ gas is injected into said stream through said nozzle at an exit velocity from the nozzle of Mach 1 to Mach 5.

16. The method in accordance with claim 15 wherein injection of carbon dioxide creates a two-phase gas liquid mixture.

17. A method of treating a high pH alkaline solution containing heavy metal ions selected from the group consisting of $Cr^{+6}$, Ni, Cu, Fe, and Zn to lower the pH and reduce the level of heavy metal ions contained therein comprising:
(a) providing a body of said alkaline solution;
(b) flowing a stream of said solution from said body to a reaction vessel;
(c) injecting $CO_2$ gas through a nozzle into said stream of solution in a direction counter current to flow of said stream, the injecting performed at a velocity in the range of Mach 1 to March 5;
(d) thereafter adding metal ions selected from the group consisting of $Fe^{+2}$ and Mn to reduce said heavy metal ions and to cause precipitation of heavy metal hydroxide precipitates and further lower the pH of said solution; and
(e) separating the heavy metal hydroxide precipitates from the solution to provide a solution having a reduced amount of heavy metal ions contained therein and having a lowered pH.

18. The method in accordance with claim 17 wherein Fe ions are added in an acid selected from the group consisting of Hcl, $H_2SO_4$, and $HNO_3$.

19. The method in accordance with claim 17 wherein the stream is pumped to the reaction vessel at a velocity in the range of 0.2 to 300 ft/sec.

20. The method in accordance with claim 17 wherein the $CO_2$ gas in said reaction vessel is maintained at a pressure in the range of 25 to 675 psig.

21. The method in accordance with claim 17 wherein the Fe ions are added electrolytically from an Fe anode.

22. The method in accordance with claim 17 wherein the pH is in the range of 10.5 to 13.8.

23. The method in accordance with claim 17 wherein the Fe ions are added electrolytically by passing electrical current between an Fe anode and an Fe cathode and the polarity between said anode and cathode is reversed not less than every 2 seconds.

24. The method in accordance with claim 17 wherein after the injecting with $CO_2$ gas, unreacted $CO_2$ gas is removed from said solution in the reaction vessel.

25. The method in accordance with claim 19 wherein the velocity is at a rate of 5 to 250 ft/sec.

26. The method in accordance with claim 19 wherein said $CO_2$ gas is injected into said solution at a velocity of Mach 2 to March 4.

27. A method of treating an alkaline solution containing heavy metal ions selected from the group consisting of $Cr^{+6}$, Ni, Cu, Fe, and Zn to to reduce the amount of heavy metal ions contained therein comprising:
(a) providing a body of said alkaline solution;
(b) pumping a stream of said solution from said body to a reaction vessel;
(c) injecting $CO_2$ gas through a nozzle into said stream at a supersonic velocity exiting from said nozzle to lower the pH;
(d) maintaining said $CO_2$ gas in contact with said solution at a pressure in the range of 25 to 675 psig in said reaction vessel, the reaction vessel containing a packing material in a lower portion thereof and said stream being introduced into said lower portion of said reaction vessel to permit said solution containing $CO_2$ gas to pass therethrough;
(e) removing solution from said reaction vessel and adding $Fe^{+2}$ ions to said solution removed from said reaction vessel to reduce said heavy metal ions to form heavy metal hydroxide precipitates; and
(f) separating the heavy metal hydroxide precipitates from the solution to provide a solution having a reduce amount of heavy metal ions contained therein and having a lowered pH.

28. The method in accordance with claim 27 wherein in said reaction vessel the solution has a level located above said packing material and a solution stream is withdrawn from a level above said packing material.

29. The method in accordance with claim 28 wherein said reaction vessel has a $CO_2$ gas exhaust valve to control the $CO_2$ gas pressure above said solution in said vessel.

30. The method in accordance with claim 29 wherein said $CO_2$ exhaust valve exhausts $CO_2$ gas in response to $CO_2$ gas level in said stream of solution withdrawn from said vessel.

31. A method of continuously treating an alkaline solution containing metal ions selected from the group consisting of $Cr^{+6}$, Ni, Cu, Fe, and Zn to reduce the amount of said metal ions contains therein comprising:

(a) providing a stream of said alkaline solution at a pressure in the range of 10 to 175 psig and flowing at a velocity of 0.2 to 300 ft/sec;

(b) injecting $CO_2$ gas through a nozzle into said stream in a direction substantially counter current to said stream, the $CO_2$ gas exiting said nozzle at a velocity in the range of Mach 1 to Mach 5, the $CO_2$ gas effective in lowering the pH of the solution;

(c) continuously introducing said stream of solution containing said $CO_2$ gas to a reaction vessel;

(d) permitting excess $CO_2$ gas to separate from said solution by escaping to an upper region of said vessel and exhausting a portion of said $CO_2$ gas from said upper region;

(e) maintaining said $CO_2$ gas in said upper region at a pressure in the range of 10 to 175 psig over said solution in said vessel;

(g) withdrawing a stream of solution substantially depleted of $CO_2$ gas from said vessel, the stream of solution having a lowered pH;

(h) adding Fe ions to said solution having a lowered pH to reduce said heavy metal ions and to form metal hydroxide precipitate; and (i) separating the heavy metal hydroxide precipitate from the solution to provide a solution having a reduced amount of heavy metal ions contained therein and a lowered pH.

32. The method in accordance with claim 31 wherein the ions added are Fe ions in an acid selected from the group consisting of HCl, $H_2SO_4$, and $HNO_3$.

33. The method in accordance with claim 31 wherein the metal ions added are Fe ions added by electrolysis from an Fe containing anode.

34. The method in accordance with claim 36 wherein the hydroxides precipitated include chromium hydroxide and nickel hydroxide.

35. The method in accordance with claim 31 wherein the metal ions added are Fe ions added electrolytically by passing an electric current from an Fe anode to an Fe cathode and polarity between said cathode and anode is reversed not less than every 2 seconds.

36. The method in accordance with claim 31 wherein the pH is in the range of 10.5 to 13.8.

37. The method in accordance with claim 31 wherein the $CO_2$ gas converts sodium hydroxide to sodium carbonate and sodium bicarbonate.

38. The method in accordance with claim 31 wherein $CO_2$ gas exits said nozzle at a velocity in the range of Mach 2 to Mach 4.

39. The method in accordance with claim 31 wherein $CO_2$ gas is exhausted from said upper region through an exhaust valve responsive to a $CO_2$ gas level in said stream of solution leaving said vessel.

40. A method of continuously treating an acidic solution containing heavy metal ions comprising hexavalent chromium and at least one metal ion selected from the group consisting of iron, nickel, zinc, and copper to raise the pH of the solution and reduce the amount of said heavy metal ions contained therein, comprising:

(a) providing a body of said acid solution;

(b) contacting the body with $NH_3$ gas to raise the pH thereof;

(c) maintaining said $NH_3$ gas in contact with said solution at a pressure in the range of 25 to 675 psig during said contacting;

(d) adding metal ions selected from the group consisting of $Fe^{+2}$ and Mn to the solution having raised pH to reduce said hexavalent chromium to trivalent chromium and to form metal hydroxide precipitates and chromium hydroxide; and (e) separating the heavy metal hydroxide precipitates from the treated solution to provide a solution having a reduced amount of heavy metal ions contained therein and having a raised pH.

41. The method in accordance with claim 40 wherein the metal ions are Fe ions added electrolytically from an Fe anode.

42. The method in accordance with claim 40 wherein a stream of solution from said body is pumped to a reaction vessel, a nozzle located in said stream injects $NH_3$ as into said solution, the velocity of said solution in said stream being in the range of 0.2 to 300 ft/sec.

43. The method in accordance with claim 42 wherein the $NH_3$ gas is injected in a direction counter current to the flow of said stream from said body to said reactor.

44. The method in accordance with claim 42 wherein the $NH_3$ gas is injected into said solution at a supersonic exit velocity from said nozzle.

45. The method in accordance with claim 42 wherein the $NH_3$ gas is injected into said stream at a velocity in the range of Mach 1 to Mach 5.

46. The method in accordance with claim 42 wherein the $NH_3$ gas is injected into said stream at a velocity in the range of Mach 2 to Mach 4.

47. The method in accordance with claim 42 wherein the velocity of the stream is in the range of 3 to 150 ft/sec.

48. The method in accordance with claim 42 wherein the pH is in the range of 1 to 6.3.

49. The method in accordance with claim 40 wherein the $NH_3$ gas is maintained in contact with said solution at a pressure in the range of 25 to 675 psig.

50. A method of continuously treating an acidic solution containing metal ions selected from the group consisting of $Cr^{+6}$, Ni, Cu, Fe, and Zn to reduce the amount of said metal ions contained therein comprising:

(a) providing a stream of said acidic solution at a pressure in the range of 10 to 175 psig and flowing at a velocity of 0.2 to 300 ft/sec;

(b) injecting $NH_3$ gas through a nozzle into said stream in a direction substantially counter current to said stream, the $NH_3$ gas exiting said nozzle at a velocity in the range of Mach 1 to Mach 5;

(c) continuously introducing said steam of solution containing said $NH_3$ gas to a reaction vessel;

(d) permitting excess $NH_3$ gas to separate from said solution by escaping to an upper region of said vessel and exhausting a portion of said $NH_3$ gas from said upper region;

(e) maintaining said $NH_3$ gas in said upper region at a pressure in the range of 10 to 500 psig over said solution in said vessel;

(f) withdrawing a steam of solution substantially depleted of $NH_3$ gas from said vessel;

(g) adding Fe ions to said solution to reduce said heavy metal ions and to form metal hydroxide precipitate; and (h) separating the metal hydroxide precipitate from the solution to provide a solution having a reducing amount of heavy metal ions contained therein.

51. The method in accordance with claim 14 wherein the Fe ions are added electrolytically by passing electrical current from an Fe anode to an Fe cathode wherein the polarity on the anode and cathode is reversed not less than every 2 seconds.

52. The method in accordance with claim 42 wherein said $NH_3$ gas is injected into said stream through said nozzle at an exit velocity from the nozzle of Mach 1 to Mach 5.

* * * * *